United States Patent
Lenox et al.

(10) Patent No.: US 6,921,791 B2
(45) Date of Patent: Jul. 26, 2005

(54) THERMOPLASTIC ELASTOMER

(75) Inventors: Ronald S. Lenox, Lancaster, PA (US); Harry D. Ward, Lancaster, PA (US); Rebecca L. Winey, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 10/140,241

(22) Filed: May 7, 2002

(65) Prior Publication Data

US 2003/0212211 A1 Nov. 13, 2003

(51) Int. Cl.$^7$ ............................................. C08L 41/00
(52) U.S. Cl. ................. 525/208; 525/227; 525/224; 524/425; 524/445; 524/442; 524/437; 524/436
(58) Field of Search .................. 525/523, 451, 525/539, 403, 404, 407, 408; 524/425, 430, 437, 436, 442, 445

(56) References Cited

U.S. PATENT DOCUMENTS

| | | | |
|---|---|---|---|
| 4,530,856 A | 7/1985 | Kauffman et al. .......... 427/197 |
| 4,619,962 A * | 10/1986 | Sato .......................... 524/401 |
| 4,729,908 A | 3/1988 | Mahrle ........................ 427/286 |
| 4,769,416 A * | 9/1988 | Gellin et al. ................... 525/90 |
| 4,829,124 A * | 5/1989 | Clark .......................... 525/108 |
| 5,155,157 A * | 10/1992 | Statz et al. ................. 524/423 |
| 5,223,322 A | 6/1993 | Colyer et al. ............... 428/141 |
| 5,523,350 A * | 6/1996 | Venkataswamy et al. ... 525/109 |
| 5,763,501 A | 6/1998 | Bickhardt et al. .......... 521/142 |
| 6,069,202 A * | 5/2000 | Venkataswamy et al. .... 525/66 |
| 6,114,008 A | 9/2000 | Eby et al. ................... 428/151 |
| 6,218,001 B1 | 4/2001 | Chen et al. ................. 428/323 |
| 6,359,071 B1 * | 3/2002 | Watanabe et al. ........... 525/184 |

FOREIGN PATENT DOCUMENTS

| | | | | |
|---|---|---|---|---|
| JP | 4-279642 A | * | 10/1992 | ........... C08L/23/00 |
| WO | WO 92/12206 | | 7/1992 | ........... C08L/67/02 |

* cited by examiner

*Primary Examiner*—David W. Wu
*Assistant Examiner*—Rip A Lee

(57) ABSTRACT

Disclosed is a product and process for a substantially halogen-free thermoplastic elastomer. The thermoplastic elastomer can be incorporated into a decorative surface covering as a binder with the addition of an optional filler. The substantially halogen-free thermoplastic comprises the combination of a dynamically vulcanized blend of epoxidized natural rubber (ENR), ionomers and a diluent polymer such as ethylene vinyl acetate (EVA). The combination produces a pliable and flexible flooring product.

38 Claims, No Drawings

THERMOPLASTIC ELASTOMER

FIELD OF THE INVENTION

The present invention generally relates to a thermoplastic elastomer compound and in greater detail to a substantially halogen-free thermoplastic elastomer binder for use in a decorative surface covering.

BACKGROUND

Polyvinylchloride (PVC) is a thermoplastic material, which is well known as a starting material for decorative coverings. PVC is typically combined with a plasticizer to soften the thermoplastic material such that it forms a soft flexible compound suitable for use in a decorative covering. Additionally, the plasticized PVC may be combined with fillers to create a homogeneous compound that can be formed into either flooring tiles or sheeting.

Polyvinylchloride resin has been commonly used as a base resin for resin compositions containing mineral filler, due to its ability to accept higher levels of such filler. For example, compositions comprising PVC and a mineral filler such as $SiO_2$, $BaSO_4$, and $CaCO_3$ have been used in floor tile and sheeting applications, due to the high impact strength, abrasion resistance and flexibility of PVC, coupled with the low cost associated with increased filler loadings.

However, PVC has come under increased environmental scrutiny, which has resulted in increased efforts to find alternative materials for these applications. Various compounds have been proposed for creating substantially halogen-free compositions. For example, one proposed compound comprises a filled thermoplastic compositions including 30–90 parts ethylene polymer, 10–70 parts graft modified ethylene polymer, and 20–70 weight percent filler, based upon the amount of (a) and (b). Another composition includes a filled thermoplastic composition comprising 5–60 weight percent of a mixture of at least two copolymers of ethylene, having specified polar comonomer contents, 40–90 weight percent filler, and (c) 0–15 weight percent plasticizer. This composition further requires the inclusion of a plasticizer in levels up to 10 weight percent.

However, the compounds described above do not teach or disclose substantially halogen-free, highly filled compositions achieving high flexibility. In view of the above deficiencies, it would be advantageous to provide a halogen-free PVC replacement which is more easily recyclable, but which does not sacrifice physical properties.

SUMMARY

The present product and process comprises a substantially halogen-free thermoplastic elastomer. The thermoplastic elastomer may be incorporated into a decorative covering as a binder with the addition of a filler. The substantially halogen-free thermoplastic essentially comprises the combination of a dynamically vulcanized blend of epoxidized elastomer and ionomers such as partially or totally neutralized copolymers of ethylene/(meth)acrylic acid with a diluent polymer such as ethylene vinyl acetate (EVA). As used herein, the term "(meth)acrylic" means "acrylic, methacrylic or combinations thereof." The combination of epoxidized natural rubber (ENR) and an ionomer produces a relatively stiff product. The introduction of EVA to the combination of ENR and ionomer adds the synergistic effect of producing a pliable and flexible product.

In greater detail, the thermoplastic elastomer comprises an epoxidized natural rubber, an ionomer and a diluent polymer. The thermoplastic elastomer may further comprise a filler in an amount up to about 90% by weight of the thermoplastic elastomer. The filler may be selected from the group of limestone, clay, silicates, aluminum oxide, glass powder, magnesium hydroxide, aluminum hydroxide, barite, organic fillers such as wood flour, and combinations thereof. The thermoplastic elastomer acts as a binder in combination with the filler in the formation of a decorative covering or other product. The ionomer may comprise an ethylene/acrylic acid copolymer which has been at least partially metal ion neutralized. The metal ion may be selected from the group of zinc, lithium, magnesium, calcium, potassium and sodium ions, and combinations thereof. The diluent polymer may be selected from the group consisting of ethylene vinyl acetate, polyvinyl butyral and polyesters.

The diluent polymer may comprise between about 5% to about 80% by weight of the thermoplastic elastomer. The epoxidized natural rubber may comprise between about 2% to about 60% by weight of the thermoplastic elastomer and the ionomer may comprise between about 2% to about 60% by weight of the thermoplastic elastomer. Additionally, the thermoplastic elastomer may have an Olsen stiffness of less than 0.5 inch-pound at 73° F. and about 50 mil thickness, and it may be Theologically stable for at least 30 minutes at 250° F.

Additionally, a decorative covering is provided comprising a thermoplastic elastomer composition comprising a dynamically vulcanized blend of an epoxidized natural rubber and an ionomer, a diluent polymer and an optional filler. The decorative coating may further include a nonwoven backing and a wear layer. The decorative coating may be formed into a flooring tile or a sheet.

Furthermore, the present invention comprises a method for making a thermoplastic elastomer. The method includes combining an epoxidized natural rubber, an ionomer and a diluent polymer to create the thermoplastic elastomer. Additionally, a filler may be added in an amount up to about 90% by weight of the thermoplastic elastomer. The diluent polymer may be combined in the thermoplastic elastomer in an amount comprising between about 5% to about 80% by weight of the thermoplastic elastomer. In another embodiment the diluent polymer may be combined in an amount between about 30% to about 75% by weight of the thermoplastic elastomer.

DETAILED DESCRIPTION

The present product and process comprises a substantially halogen-free thermoplastic elastomer for use in a decorative surface covering and other products as a binder with the addition of a filler. The substantially halogen-free thermoplastic comprises the combination of a dynamically vulcanized blend of epoxidized natural rubber (ENR), ionomers such as copolymers of ethylene/acrylic acid and a diluent polymer such as ethylene vinyl acetate (EVA). The introduction of EVA to the ENR and ionomer combination adds the synergistic effect of producing an elastomer useful as a pliable and flexible flooring product.

The thermoplastic elastomer comprises an epoxidized natural rubber, an ionomer and a diluent polymer. The thermoplastic elastomer may further comprise a filler in an amount up to about 90% by weight of the thermoplastic elastomer. The filler may be selected from the group of limestone, clay, silicates, aluminum oxide, glass powder, magnesium hydroxide, aluminum hydroxide, barite, organic fillers such as wood flour, and combinations thereof. The thermoplastic elastomer acts as a binder in combination with the filler in the formation of a decorative surface covering or other product.

Epoxidized Elastomers

Epoxidized elastomers include epoxidized natural rubber, or any elastomeric material that contains epoxy functionality such as epoxidized EPDM, NBR and SBR.

The epoxidized elastomer may comprise between about 2% to about 60% by weight of the thermoplastic elastomer. Examples of epoxidized natural rubbers include ENR-25 and ENR-50 (epoxidized natural rubbers) available from Guthrie Latex, Inc. ENR-25 has 25% of the double bonds in the natural rubber epoxidized, while ENR-50 has 50% of the bonds epoxidized.

Ionomer

The ionomer may comprise between about 2% to about 60% by weight of the thermoplastic elastomer. Example ionomers include Surlyn® which is available from the Dupont Company in various formulations. For example, Surlyn® 8920 has a relatively high methacrylic acid content, a melt index of 1.0 dg/min and has a sodium cation, while Surlyn® 9020 has a relatively low methacrylic acid content, a melt index of 1.0 dg/min and a zinc cation. Additionally, Surlyn® 9910 has a relatively high methacrylic acid level, a melt index of 0.5 dg/min and a zinc cation. Additional examples of ionomers are Iotek materials obtained from ExxonMobil and include Iotek 7010 (zinc ion, melt index of 0.8) and Iotek 8000 (sodium ion, melt index 0.8).

Diluent Polymer

The diluent polymer may comprise between about 5% to about 80% by weight of the thermoplastic elastomer. An example of a diluent polymer is Elvax® (EVA) from the Dupont Company. Elvax® 750 has 9% vinyl acetate and a melt index of 7.0 dg/min. Additionally, Elvax® 265 has 28% vinyl acetate and a melt index of 3.0 dg/min. Escorene polymers from Exxon Mobil, such as Escorene UL7765 and Ultrathane polymers from Equistar such as Ultrathane 634-04 can also be used. Other diluents can include polyesters or polyvinyl butyral. Essentially, any polymer material can be used as the diluent polymer as long as when it is combined with the epoxidized elastomer and ionomer, the final composition meets desired physical properties and flexibility.

Decorative Covering

Decorative coverings include any design or pattern containing covering that provides an enhanced appearance to a substrate. These can include wall coverings, floor coverings, ceilings, and countertops. Decorative Coverings are well known in the art and include those defined in U.S. Pat. Nos. 4,530,856, 4,729,908, 5,763,501, 6,114,008, 6,218,001 and 5,223,322.

Method

Furthermore, the present invention comprises a method for making a thermoplastic elastomer. The method includes combining an epoxidized natural rubber, an ionomer and a diluent polymer to create the thermoplastic elastomer. This needs to be carried out a temperatures above 250° F. using conditions of shear sufficient to cause molecular blending and reaction of the polymeric components. This can be done on a two roll mill, a Banbury mixer, a Farrell mixer, a Buss Kneader, a twin screw extruder or other shearing devices that are well known in the art. Additionally, a filler may be added in a amount up to about 90% by weight of the thermoplastic elastomer. The diluent polymer may be combined in the thermoplastic elastomer in an amount comprising between about 5% to about 80% by weight of the thermoplastic.

EXAMPLES

The following examples are intended to illustrate the invention and variations will occur to those skilled in the art. Accordingly, it is intended that the scope of the invention should be limited only by the appended claims.

Olsen Stiffness values in the following examples were obtained on Tinius Olsen Stiffness Testers with a range of 0 to 6 inch-pounds or 0 to 50 inch-pounds depending on the sample stiffness. The protocol described in ASTM D-747 was followed to measure the values with the exception that the values reported were obtained at an angle of 20 degrees and sample run on the 50 in-pound machine were 2" wide as opposed to 1" wide.

Example 1

In order to measure the stiffness of filled individual polymer components, samples were prepared on a two roll heated mill. All samples for this example were prepared using 65% (w/w) of finely ground limestone filler as described herein. Two hundred and fifty grams of the polymer was placed on the heated mill rolls. After 30 seconds, the rolls were started on slow speed, but as the material melted, the speed of the rolls was increased. After the polymer formed a uniform sheet, 465 grams of finely ground limestone was worked into the sheet and mixing was continued for five minutes. A release aid (Kemamide W-40 from Witco Chemical Co.) may be used to enable the release of the material from the heated rolls. The temperature of the mill roll from which the material was removed from was about 237°–335° F. depending on the polymer. Sheets were taken which had a nominal thickness of 0.050 inches. These were then evaluated for flexibility using the Olsen Stiffness test. The stiffness test is a measure of the force in inch-pounds needed to bend the material 20 degrees. The test results of the separate polymers are listed in Table I. Data listed in the following table were obtained using a 6 in-pound testing machine.

TABLE I

Olsen Stiffness of 65% Filled Polymers at 73.4° F. and 55° F.

| Polymer | Olsen Stiffness at 73.4° F. | Olsen Stiffness at 55° F. |
| --- | --- | --- |
| ENR-50 | 0.0 (too small to measure) | 0.0 (too small to measure) |
| ENR-25[1] | 0.025 | Not measured |
| Elvax 750 | 0.395 | 0.400 |
| Elvax 265 | 0.12 | 0.117 |
| Elvax 40L-03 | 0.043 | 0.048 |
| Surlyn 9020 | 1.05 | 1.113 |

[1]60% filled sample.

Example 2

Filled blends of epoxidized natural rubber (ENR-50), Surlyn 9020 (Zn ionomer) and Elvax 750, Elvax 265 or Elvax 40L-03 were made using a Banbury mixer. These blends were evaluated at 65% filler loadings. The batch size used for these experiments was 800 grams of the blended polymer and 1486 grams of limestone. The conditions used to compound these materials using the Banbury were 64 rpm for 60 seconds, 150 rpm for 60 seconds, then 150 rpm until the temperature of the mix reached 320° F. The mix was then discharged from the mixer and placed on a heated two roll mill. The temperature of the mill roll from which the material was removed was 257°–259° F. Sheets, which were nominally 0.050 inch in thickness, were evaluated for flexibility using the Olsen Stiffness test. To demonstrate the synergistic effect of the EVA on reducing the blend stiffness, a calculated value of the Olsen Stiffness of the blend was done by taking the percentage of each polymer in the total polymer level times the stiffness of that polymer alone (loaded to 65% filler and made as described in Example 1) and adding up the three values for the different polymers. For example, for a blend of 8% ENR-50, 40% Elvax 750 (EVA) and 52% Surlyn 9020, the calculation was:

(0.08×0)+(0.40×0.395)+(0.52×1.05)=0+0.158+0.546=0.704 inch pounds

The actual stiffness of this blend is 0.48 inch-pounds, significantly less than predicted.

The calculated and actual Olsen Stiffness values at 73.4° F. and 55° F. for a number of blends are recorded in Tables II and III. Data listed in the following table were obtained using a 6 in-pound testing machine.

TABLE II

Olsen Stiffness of 65% Filled Formulations at 73.4° F.

| Binder[1] | Ratio[2] | Calculated Stiffness[3] | Actual Stiffness[4] |
| --- | --- | --- | --- |
| ENR-50/Elvax 750/Surlyn 9020 | 8/40/52 | 0.704 | 0.48 |
| ENR-50/Elvax 265/Surlyn 9020 | 8/40/52 | 0.594 | 0.19 |
| ENR-50/Elvax 40L-03/Surlyn 9020 | 8/40/52 | 0.563 | 0.195 |
| ENR-50/Elvax 750/Surlyn 9020 | 16/40/44 | 0.620 | 0.400 |
| ENR-50/Elvax 265/Surlyn 9020 | 16/40/44 | 0.510 | 0.188 |
| ENR-50/Elvax 40L-03/Surlyn 9020 | 16/40/44 | 0.479 | 0.068 |
| ENR-50/Elvax 750/Surlyn 9020 | 25/40/35 | 0.526 | 0.390 |
| ENR-50/Elvax 265/Surlyn 9020 | 25/40/35 | 0.416 | 0.153 |
| ENR-50/Elvax 40L-03/Surlyn 9020 | 25/40/35 | 0.385 | 0.039 |

[1]Binder: These are the polymers that were used as the binder for this formulation.
[2]Ratio: The relative amounts of the polymers listed in the Binder column.
[3]Calculated Stiffness: The sum of the relative amounts of the polymers times the Olsen Stiffness value listed for each polymer in Table I.
[4]Actual Stiffness: The value for the stiffness that was obtained from the Olsen Stiffness instrument for this sample.

TABLE III

Olsen Stiffness of 65% Filled Formulations at 55° F.

| Binder[1] | Ratio[2] | Calculated Stiffness[3] | Actual Stiffness[4] |
| --- | --- | --- | --- |
| ENR-50/Elvax 750/Surlyn 9020 | 8/40/52 | 0.739 | 0.475 |
| ENR-50/Elvax 265/Surlyn 9020 | 8/40/52 | 0.626 | 0.222 |
| ENR-50/Elvax 40L-03/Surlyn 9020 | 8/40/52 | 0.598 | 0.220 |
| ENR-50/Elvax 750/Surlyn 9020 | 16/40/44 | 0.650 | 0.420 |
| ENR-50/Elvax 265/Surlyn 9020 | 16/40/44 | 0.537 | 0.190 |
| ENR-50/Elvax 40L-03/Surlyn 9020 | 16/40/44 | 0.509 | 0.094 |
| ENR-50/Elvax 750/Surlyn 9020 | 25/40/35 | 0.550 | 0.400 |
| ENR-50/Elvax 265/Surlyn 9020 | 25/40/35 | 0.437 | 0.205 |
| ENR-50/Elvax 40L-03/Surlyn 9020 | 25/40/35 | 0.409 | 0.058 |

[1]Binder: These are the polymers that were used as the binder for this formulation.
[2]Ratio: The relative amounts of the polymers listed in the Binder column.
[3]Calculated Stiffness: The sum of the relative amounts of the polymers times the Olsen Stiffness value listed for each polymer in Table I.
[4]Actual Stiffness: The value for the stiffness that was obtained from the Olsen Stiffness instrument for this sample.

Example 3

Evaluations of various combinations of different Surlyns, EVAs, and ENRs along with filler levels were tested in this example. The samples were prepared using the Banbury mixer to blend the materials and the two roll mill to prepare sheets for testing as described in Example 2. Listed in Table IV below are examples of the ranges of Olsen Stiffness values that can be obtained. Data listed in the following table were obtained using a 6 in-pound testing machine.

TABLE IV

| Binder | Polymer Ratio | Filler Level | Olsen Stiffness (inch-pounds) |
| --- | --- | --- | --- |
| A. ENR25/Elvax 265/Surlyn 9020 | 8/40/52 | 65% | 0.168 |
| B. ENR50/Elvax 265/Surlyn 9020 | 8/40/52 | 65% | 0.190 |
| C. ENR25/Elvax 265/Surlyn 9020 | 8/40/52 | 75% | 0.305 |
| D. ENR25/Elvax 265/Surlyn 8920 | 8/40/52 | 75% | 0.465 |
| E. ENR25/Elvax 40L-03/Surlyn 9020 | 8/40/52 | 75% | 0.220 |
| F. ENR50/Elvax 265/Surlyn 9020 | 16/40/44 | 65% | 0.237 |
| G. ENR50/Elvax 40L-03/Surlyn 9020 | 16/40/44 | 65% | 0.150 |
| H. ENR50/Escorence 7765/Surlyn 9910 | 16/40/44 | 65% | 0.267 |

Example 4

A blend comprising 35% polymer and 65% limestone filler was made where the polymer consisted of 44% Surlyn 9020, 20% Elvax 265, 20% Elvax 40L-03 and 16% ENR-50. This was used to prepare various product structures. The materials were dry blended in a Papenmeier mixer and then melt mixed and reacted using a Buss Kneader. The hot extrudate from the Buss was made into sheets using heated calender rolls and laminated to a 32 mil flooring felt while on the calender roll. Using a hot press set at 300° F. on the top platen only and 100 psi for 90 seconds, the polymer surface was embossed using a release paper and a textured aluminum plate to prepare a representative homogenous flooring structure. A smooth aluminum plate was used on the bottom and the sample cooled to below 200° F. in the press under pressure before removing. The polymeric surface of these sheets was very smooth and glossy.

Example 5

Blends of Example 4 containing a blue pigment were dry blended in a Papenmeier mixer and fluxed in a Buss kneader as in Example 4. The extrudate was a deep blue. Chips of cold identical fluxed material colored orange and white were sprinkled into the hot extrudate and the entire mix run through a two roll calender to give a homogenous, smooth-surfaced sheet with a pleasing visual where the white and orange chips showed up as random decorative streaks. These sheets could also be optionally pressed or embossed as in Example 4 to give a very smooth and glossy surface.

Example 6

Sheets, optionally of different or like colors, prepared as in Example 4 can also be processed into chips, which are then pressed together to form chip visuals. The chips were laid-up on a felt carrier and then pressed together using a flat bed press. The press platens both top and bottom were heated to 325° F. The sample was placed between release paper and aluminum plates during the press cycle. The material was preheated at contact pressure for three minutes and then pressed at 50 psi for 2 minutes. Samples were cooled under pressure to 200° F. then removed from the press. The visual was distinct in that the original chip shape could still be detected but the structure had melted and flowed together to give a continuous sheet. These sheets had a very smooth and glossy surface and could optionally be embossed with heat and pressure.

Example 7

Numerous flooring structures can be prepared incorporating the filled base layer and lamination techniques. The base layer used in this example comprised 35% polymer and 65% limestone filler where the polymer was a blend of 44% Surlyn 9020, 40% Elvax 265, and 16% ENR-50. Prototypes were made using glass mats and wearlayer films to build different product structures. These materials were fabricated using a flat bed press. The various layers were placed on top of one another and then placed between release paper and aluminum plates. The composites were placed into a press set at room temperature. The platens were then closed and 50 psi pressure was applied to the material. The sample was heated under pressure to 290° F. and then cooled under pressure to 150° F. The sample was then removed from the press. A few of the structures that have been prepared using this technique are as follows:

A. An 85 mil thick sheet of the base was adhered to a 0.003" pre-printed urethane wear layer. The wear layer can optionally have another high performance coating on top.

B. A 65 mil sheet of the base was overlaid with a glass scrim followed by a 25 mil base layer, which in turn was covered with the urethane wear layer.

C. A structure identical to that in B except that a second glass scrim is placed under the 65 mil base sheet to give a structure containing two scrims.

D. Structure A, B or C where the 0.003" urethane was replaced with a Surlyn film, a polypropylene film, or a polyethylene film of various thicknesses.

Example 8

A blend of 35% of a polymer blend consisting of 44% Surlyn 9020, 40% Escorene 7765 and 16% ENR 50 and 65% finely ground limestone was mixed and fluxed in a Banbury. The hot material was removed from the Banbury at 320° F. and placed on a two roll mill. The mill rolls were heated to 230° F. and 250° F. respectively. After the material was sheeted on the mill, a sample was removed immediately while the rest of the material was allowed to remain on the operating mill under continual heat and shear. Samples were taken at 5, 10, 15, 20, 25 and 30 minutes. All samples were then cooled and the shear viscosity determined on a Kayeness Capillary Rheometer using a ram rate of 0.360 and a set temperature of 380° F. The shear viscosity values are given below. There was no evidence of scorching or discoloration of any of the samples. This, along with the small viscosity changes noted, shows that this polymer blend is capable of recycling and long periods of shear work without degradation or excessive crosslinking.

| Sample | Shear Viscosity Pa-sec |
| --- | --- |
| .25 minute (immediate removal) | 3249 |
| 5 minutes | 3602 |
| 10 minutes | 3669 |
| 15 minutes | 3932 |
| 20 minutes | 3901 |
| 25 minutes | 3660 |
| 30 minutes | 3716 |

Example 9

A blend of 35% of a polymer mixture consisting of 44% Surlyn 9020, 40% Elvax 265 and 16% ENR-50 and 65% of finely ground limestone was prepared in a Buss Kneader and calendered to give a uniform sheet. The W. W. Henry Company S-760 latex-based linoleum adhesive was spread on the back of the sheet with a notched trowel and allowed to dry overnight. A urethane wear layer that represented a typical wear layer was cut into small pieces along with the adhesive-covered sheet and processed through a Banbury and milled as described in Example 8. Smooth sheets were formed which gave tensile, elongation, tear, stiffness and indentation values comparable to the initial material. This demonstrates the potential for removing a floor structure made from these blends and recycling it into a new floor.

Example 10

Samples of the blend in Example 9 were back-sanded and spread with S-760 linoleum adhesive and applied to cement board. This water-based adhesive is based on a rubber latex and resin mixture and is produced by The W. W. Henry Company. After application, the adhesive was given a five minute open time and the samples were placed into the adhesive. Samples were rolled with a steel roller to remove air bubbles and the samples allowed to set for 24 hours and one week at room temperature. Samples were pulled by an edge and qualitatively evaluated by the amount of resistance to peel. This blend showed excellent adhesion at both 24 hours and one week. Since many non-PVC materials do not show good adhesion with environmentally desirable water based adhesives, this is an unexpected, surprising and highly desirable result.

Example 11

A sheet of filled polymer blend as described in Example 4 was coated with a typical UV-curable acrylated polyester high performance coating. The coating was cured by exposure to UV light. When cured, the coating showed exceptional adhesion to the filled polymer blend, making this a way of providing a clear high performance coating over a colored or printed polymer blend base.

While specific embodiments have been set forth as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A composition comprising a thermoplastic elastomer, the thermoplastic elastomer being the reaction product of a dynamically vulcanized blend consisting of (a) at least one epoxidized elastomer, (b) at least one ionomer and (c) a component selected from the group consisting of (i) a diluent polymer selected from the group consisting of ethylene vinyl acetate copolymer polyvinyl butyral and combinations thereof and (ii) a combination of the diluent polymer and an additive selected from the group consisting of plasticizers, stabilizers, antioxidants, fire retardants, pigments, oils, fillers and combinations thereof.

2. The composition of claim 1, wherein the epoxidized elastomer is epoxidized natural rubber.

3. The composition of claim 2, wherein the thermoplastic elastomer comprises from about 2% to about 60% by weight of the epoxidized natural rubber.

4. The composition of claim 1, wherein the ionomer is an at least partially neutralized copolymer of (meth)acrylic acid.

5. The composition of claim 4, wherein the copolymer of (meth)acrylic acid is at least partially neutralized with metal ions selected from the group consisting of zinc ions, lithium ions, magnesium ions, calcium ions, potassium ions, sodium ions and combinations thereof.

6. The composition of claim 1, further comprising a filler.

7. The composition of claim 6, wherein the composition comprises up to about 90% by weight of the filler.

8. The composition of claim 6, wherein the filler is selected from the group consisting of limestone, clay, silicates, aluminum oxide, glass powder, magnesium hydroxide, aluminum hydroxide, barite, organic fillers and combinations thereof.

9. The composition of claim 1, further comprising an additive selected from the group consisting of plasticizers, stabilizers, antioxidants, fire retardants, processing aids, pigments, oils and combinations thereof.

10. The composition of claim 1, wherein the thermoplastic elastomer comprises between from about 5% to about 80% by weight of the diluent polymer.

11. The composition of claim 1, wherein the thermoplastic elastomer comprises from about 2% to about 60% by weight of the ionomer.

12. The composition of claim 1, wherein the thermoplastic elastomer is rheologically stable for at least 30 minutes at 250° F.

13. A decorative surface covering comprising a thermoplastic elastomer composition, wherein the thermoplastic elastomer composition comprises a thermoplastic elastomer, the thermoplastic elastomer being the reaction product of a dynamically vulcanized blend consisting of (a) at least one epoxidized elastomer, (b) at least one ionomer and (c) a component selected from the group consisting of (i) a diluent polymer selected from the group consisting of ethylene vinyl acetate copolymer, polyvinyl butyral, polyesters and combinations thereof and (ii) a combination of the diluent polymer and an additive selected from the group consisting of plasticizers, stabilizers, antioxidants, fire retardants, pigments, oils, fillers and combinations thereof.

14. The decorative surface covering of claim 13, wherein the epoxidized elastomer is epoxidized natural rubber.

15. The decorative surface covering of claim 14, wherein the thermoplastic elastomer comprises from about 2% to about 60% by weight of the epoxidized natural rubber.

16. The decorative surface covering of claim 13, wherein the ionomer comprises an at least partially neutralized copolymer of (meth)acrylic acid.

17. The decorative surface covering of claim 13, wherein the thermoplastic elastomer composition comprises up to about 90% by weight of a filler.

18. The decorative surface covering of claim 13, wherein the thermoplastic elastomer composition comprises a filler selected from the group consisting of limestone, clay, silicates, glass powder, magnesium hydroxide, aluminum hydroxide, barite, organic fillers and combinations thereof.

19. The decorative surface covering of claim 13, wherein the thermoplastic elastomer composition further comprises an additive selected from the group consisting of stabilizers, antioxidants, pigments, oils and combinations thereof.

20. The decorative surface covering of claim 13, wherein the thermoplastic elastomer comprises between from about 5% to about 80% by weight of the diluent polymer.

21. The decorative surface covering of claim 13, wherein the thermoplastic elastomer comprises from about 2% to about 60% by weight of the ionomer.

22. The decorative surface covering of claim 13, wherein the thermoplastic elastomer composition has an Olsen stiffness of less than 0.5 inch-pound at 73° F.

23. A decorative surface covering comprising a thermoplastic elastomer composition, wherein the thermoplastic elastomer composition comprises a thermoplastic elastomer, the thermoplastic elastomer being the reaction product of a dynamically vulcanized blend comprising an epoxidized elastomer, an ionomer, and a diluent polymer, wherein the decorative surface covering is in the form of a flooring tile.

24. The decorative surface covering of claim 23, wherein the epoxidized elastomer comprises epoxidized natural rubber.

25. The decorative surface covering of claim 24, wherein the thermoplastic elastomer comprises from about 2% to about 60% by weight of the epoxidized natural rubber.

26. The decorative surface covering of claim 23, wherein the ionomer comprises an at least partially neutralized copolymer of (meth)acrylic acid.

27. The decorative surface covering of claim 23, wherein the thermoplastic elastomer comprises from about 2% to about 60% by weight of the ionomer.

28. The decorative surface covering of claim 23, wherein the thermoplastic elastomer comprises from about 5% to about 80% by weight of the diluent polymer.

29. The decorative surface covering of claim 23, wherein the thermoplastic elastomer composition comprises up to about 90% by weight of a filler.

30. The decorative surface covering of claim 23, wherein the thermoplastic elastomer composition comprises a filler selected from the group consisting of limestone, clay, silicates, glass powder, magnesium hydroxide, aluminum hydroxide, barite, organic fillers and combinations thereof.

31. The decorative surface covering of claim 23, wherein the blend comprises a filler selected from the group consisting of limestone, clay, silicates, glass powder, magnesium hydroxide, aluminum hydroxide, barite, organic fillers and combinations thereof.

32. The decorative surface covering of claim 23, wherein the thermoplastic elastomer composition comprises an additive selected from the group consisting of stabilizers, antioxidants, pigments, oils and combinations thereof.

33. The decorative surface covering of claim 23, wherein the blend comprises an additive selected from the group consisting of stabilizers, antioxidants, pigments, oils and combinations thereof.

34. The decorative surface covering of claim 23, wherein the thermoplastic elastomer composition has an Olsen stiffness of less than 0.5 inch-pound at 73° F.

35. The decorative surface covering of claim 23, wherein the thermoplastic elastomer is the reaction product of a dynamically vulcanized blend consisting of (a) epoxidized natural rubber, (b) at least partially neutralized copolymer of (meth)acrylic acid and (c) a component selected from the group consisting of (i) a diluent polymer selected from the group consisting of ethylene vinyl acetate copolymer polyvinyl butyral and combinations thereof and (ii) a combination of the diluent polymer and an additive selected from the group consisting of plasticizers, stabilizers, antioxidants fire retardants, pigments, oils, fillers and combinations thereof.

36. A decorative surface covering comprising a thermoplastic elastomer composition, wherein the thermoplastic elastomer composition comprises a thermoplastic elastomer, the thermoplastic elastomer being the reaction product of a dynamically vulcanized blend comprising an epoxidized elastomer, an ionomer, and a diluent polymer, wherein the decorative surface covering is in the form of a sheet.

37. A decorative surface covering comprising a thermoplastic elastomer composition, wherein the thermoplastic elastomer composition comprises a thermoplastic elastomer, the thermoplastic elastomer being the reaction product of a dynamically vulcanized blend comprising an epoxidized elastomer, an ionomer, and a diluent polymer, wherein the decorative surface covering further includes a non-woven backing.

38. A decorative surface covering comprising a thermoplastic elastomer composition, wherein the thermoplastic elastomer composition comprises a thermoplastic elastomer, the thermoplastic elastomer being the reaction product of a dynamically vulcanized blend comprising an epoxidized elastomer, an ionomer, and a diluent polymer, wherein the decorative surface covering further includes a wear layer.

* * * * *

UNITED STATES PATENT AND TRADEMARK OFFICE
CERTIFICATE OF CORRECTION

PATENT NO. : 6,921,791 B2 Page 1 of 1
DATED : July 26, 2005
INVENTOR(S) : Lenox et al.

It is certified that error appears in the above-identified patent and that said Letters Patent is hereby corrected as shown below:

<u>Column 9,</u>
Lines 16 and 58, delete word "between".

Signed and Sealed this

Thirteenth Day of September, 2005

JON W. DUDAS
*Director of the United States Patent and Trademark Office*